Dec. 16, 1952      F. E. BACHMAN      2,621,762
ROTOR

Filed May 8, 1946      2 SHEETS—SHEET 1

INVENTOR.
Fred E. Bachman,
BY
Atty.

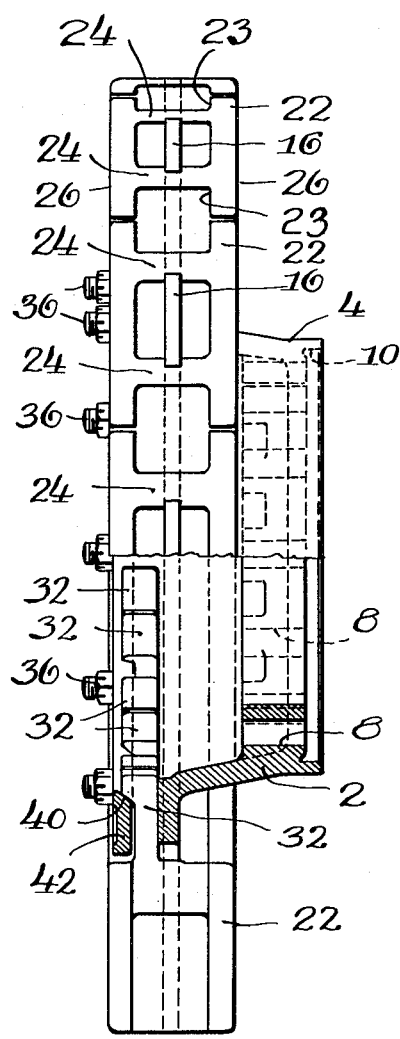
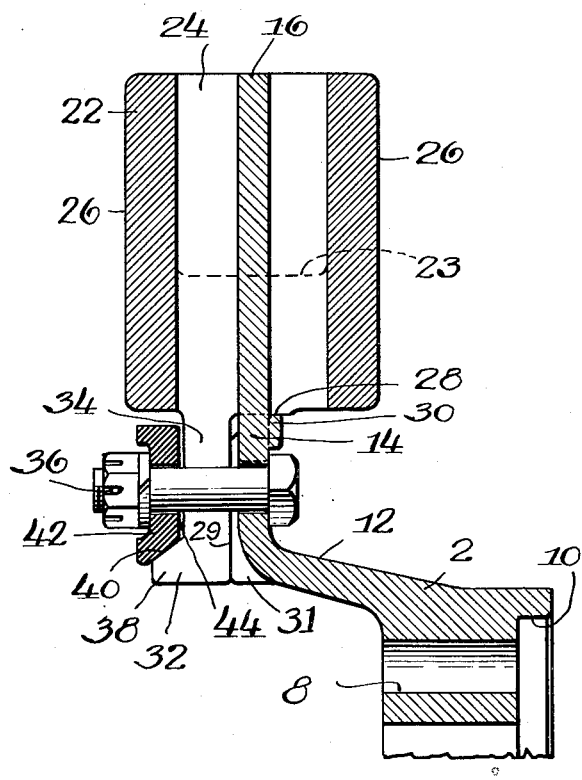

Patented Dec. 16, 1952

2,621,762

UNITED STATES PATENT OFFICE 2,621,762

ROTOR

Fred E. Bachman, Chicago, Ill., assignor to American Steel Foundries, Chicago, Ill., a corporation of New Jersey Application May 8, 1946, Serial No. 668,204

19 Claims. (Cl. 188—218)

1

My invention relates to a composite brake rotor designed for use with a wheel and axle assembly of a railway car truck wherein relatively high speeds involved develop high temperatures and necessitate a structure which will permit growth or expansion of the friction member. It is well known that this growth is permanent deformation of the metal and not mere thermal expansion with resultant contraction to original dimensions.

An object of my invention is to devise a brake rotor for association with a railway wheel and axle assembly as a composite structure comprising a central spider member with a means for connection to a carrying member, such as the hub of the associated wheel, and an arrangement for movably associating with said spider a series of segmental members on which may be formed the usual brake shoe-engaging friction surfaces.

A more specific object of my invention is to devise a composite brake rotor having a central spider member comprising a series of substantially radially arranged slots with parallel side walls affording means for receiving a plurality of segmental members having friction surfaces on opposite sides thereof for engagement with associated brake shoes.

My invention also contemplates an arrangement such as that just described wherein an annular abutment may be afforded on said central spider, limiting the inward radial movement of the friction blocks associated therewith, as well as a securing ring having a wedge face on one annular surface thereof for engagement with complementary wedge faces on said blocks, whereby said ring may urge said blocks into engagement with said abutment so that all of said parts may be rigidly fixed with respect to one another and so that the friction surfaces on opposite sides of each block may be properly aligned for engagement with the friction shoes normally associated therewith.

A different object of my invention is to devise a composite form of brake rotor for association with a railway wheel and axle assembly in such form that new braking surfaces on said rotor may be applied without the necessity of shopping the car and therefore without taking the car out of service.

In the drawings:

Figure 2 is an edge view thereof, half in section, the section being taken approximately in the radial plane indicated by the line 2—2 of Figure 1; and

2

Figure 1:
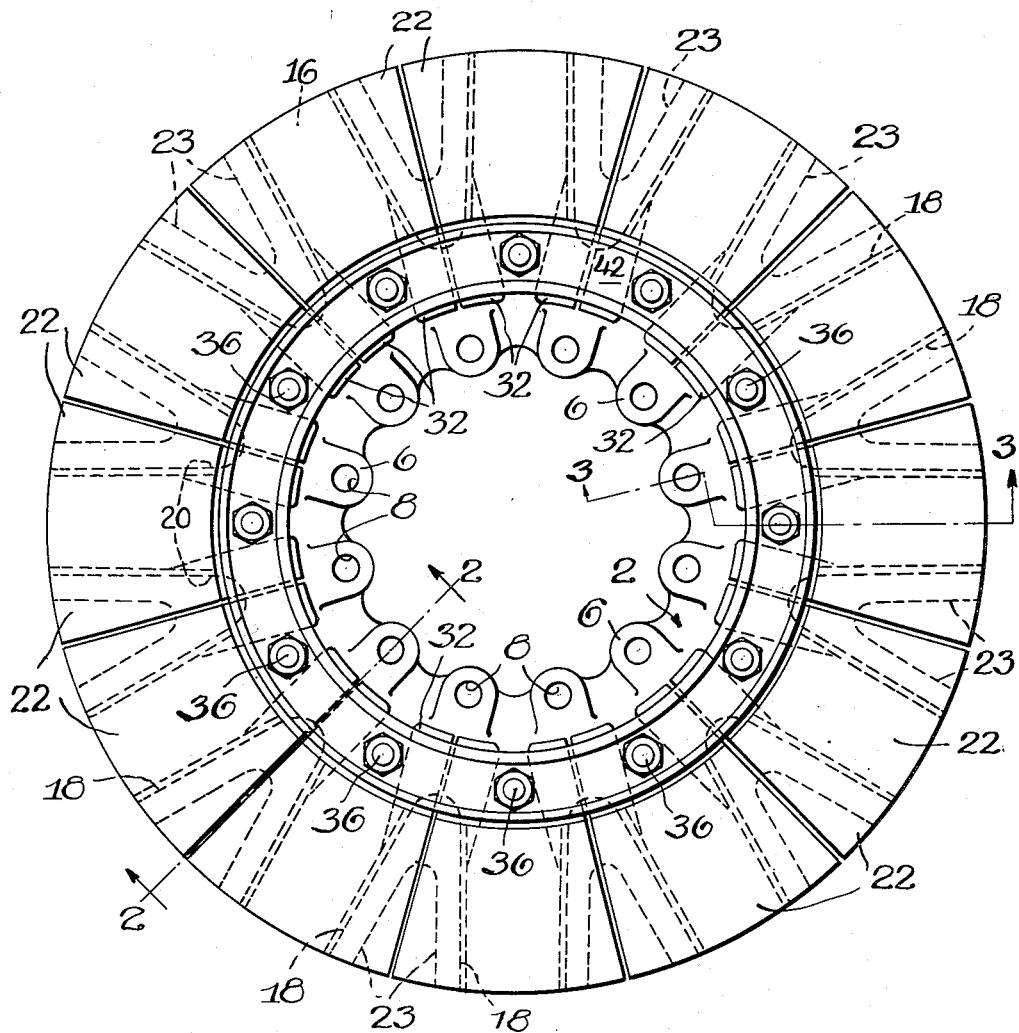
Figure 1 is a side elevation of my novel rotor structure.

Figure 3 is a further sectional view, enlarged and taken approximately in the radial planes indicated by the broken line 3—3 of Figure 1.

My novel rotor comprises a central member or spider, generally designated 2, having a hub portion 4 with a series of spaced lugs 6, 6 about its inner periphery with openings 8, 8 therein affording connecting means to a supporting member, such as a wheel hub, that may be received within the center bore 10 at the extremity of said hub. The spider 2 may comprise a flaring portion 12 merging with the vertically disposed plate or flange 14, said plate having a series of radially projecting members or fingers 16, 16 (Figure 2), each of said fingers having its lateral edges parallel as may be seen at 18, 18 (Figure 1). The fingers 16, 16 are equally spaced about the outer periphery of the plate and accordingly the said outer periphery is defined by deep-set V-shaped notches 20, 20, the form of which readily appears in the side elevation view.

The several plate fingers 16, 16 are designed as support means for the series of segmental friction members 22, 22, each of which may be removably mounted or slidably received upon the associated finger 16, each friction element or segment having spaced transverse walls 24, 24 on the inner faces of which may be formed aligned slots for slidable reception of the lateral edges of the associated plate finger 16. Outwardly of the transverse walls 24, 24, each segment 22 may be relieved as at 23, 23, thus somewhat reducing the weight thereof providing fluid passages along the radial edges of the segment. The manner in which the finger members 16 fit within the slots in the transverse walls 24, 24 of the segmental members 22, 22 is well seen at the top of Figure 2, and it will be noted that the fluid chambers are defined at opposite sides of each finger by the walls of the friction element whereby during rotation fluid is drawn through the inner ends of the chamber and expelled from the radially outer ends thereof. Each friction segment 22 is, of course, segmental in side elevation, as well seen in Figure 1, and is bisymmetrical in form so that the friction faces 26, 26 at each side thereof are properly aligned without difficulty.

Each friction segment 22 may seat as at 28 and 29 (Figure 3), on the annular shoulder 30 and the seat 31, respectively, formed on the plate 14 at the base of the fingers 16, 16. At the inner edge of each segment may be formed a plurality of spaced lugs 32, 32 (Figure 2), joined by the web 34, said web having a central opening aligned with an adjacent opening in the plate 14 for reception of a securing bolt and nut assembly 36. On each lug 32 may be a projecting toe 38 (Figure 3) having a wedge face in complementary engagement as at 40 with a wedge face on the inner perimeter of the securing ring 42, said securing ring likewise having a series of openings for reception of the securing bolt and nut assemblies 36. It will thus be seen that each segment 22 is removably fitted upon the associated finger 16. The fingers 16 form driving connection between the segments and the spider or support structure for transmitting rotational movement of said spider to said segments. Each segment seats as at 28 and 29 against a radially outwardly facing seat on the annular flange 30 formed on one face of the plate 14 and against seat 31, respectively, and extends inwardly of the spider for reception of the securing bolt end in order to afford wedge engagement with the securing ring. By this means the securing bolts act as tension members to draw the securing ring tightly into wedge engagement with the wedge faces at the inner ends of the segments, thus seating them tightly against the shoulder 30 and seat 31 so that the single ring member acts to secure all of the segments tightly into position upon the spider, thus making a rigid assembly of the whole rotor. The ring, in addition to securing the friction segments to the spider and against the seats, also restrains radially outward movement of the friction segments due to rotational movement of the rotor. It will be understood, of course, that some clearance must be afforded between the ring 42 and the lugs 32, 32 as at 44 (Figure 3) in order that the wedge engagement at 40 may properly function. It will be apparent to those skilled in the art that my novel composite rotor is particularly well adapted for the service intended in that not only does it permit the application or removal of the friction portions of the rotor while the wheel and axle assembly upon which it may be mounted remains in service, but it also provides a satisfactory solution for the problems which arise as a result of normal service to which these types of rotor are subjected, in which the tremendous heats developed result in permanent growth of the rotor structure itself.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A brake rotor comprising a spider having a hub portion merging with a flange portion having radially arranged projections about its outer periphery, a segmental friction element mounted upon each of said projections in tongue and groove engagement therewith and in abutment with said flange portion, said elements presenting wedge surfaces, a retaining ring having wedge means, and fastening means connecting said flange portion and ring to urge said wedge surfaces and wedge means into engagement and to securely draw said elements against said flange portion.

2. A rotor for association with a railway wheel and axle assembly and comprising a central spider having a hub portion merging with a central plate having radially arranged projections about its outer periphery, segmental friction elements removably mounted upon said projections, wedge means for retaining said elements in position on said plate, said wedge means comprising a single ring member in wedge engagement with all of said segments, and tension means fixing said ring to said plate.

3. A rotor for association with a railway wheel and axle assembly and comprising a central spider having a hub portion merging with a central plate having radially arranged projections about its outer periphery, segmental friction elements removably mounted upon said projections, and wedge means for retaining said elements in position on said plate, said wedge means comprising a single ring member in wedge engagement with all of said elements.

4. A rotor for association with a railway wheel and axle assembly and comprising a central spider having a hub portion merging with a central plate having radially arranged projections about its outer periphery, segmental friction elements removably mounted upon said projections, and wedge means for retaining said elements in position on said plate, said plate having an annular shoulder affording positioning means for said elements upon said projections.

5. A brake rotor comprising a spider having a hub portion merging with a flange portion having radially arranged projections about its outer periphery, segmental friction elements mounted upon respective projections in abutment with said flange portion, each element having a fluid chamber, each of said projections having parallel lateral edges in tongue and groove engagement with parallel slots in the associated element, said elements presenting wedge surfaces, a retaining ring in wedge engagement with all of said surfaces, and readily removable fastening means connecting said flange portion and ring and acting upon said wedge engagements to securely draw said elements against said flange portion.

6. A brake rotor comprising a spider having a hub portion merging with a flange portion having radially arranged projections about its outer periphery, segmental friction elements mounted upon respective projections in abutment with said flange portion, each element having a fluid chamber receiving one of said projections, each of said projections having parallel lateral edges in tongue and groove engagement with parallel slots in the associated element, said elements presenting wedge surfaces, a retaining ring in wedge engagement with all of said surfaces, and adjustable fastening means connecting said flange portion and ring to securely draw said elements against said flange portion.

7. A rotor comprising an integral spider having a hub and a plate, said plate having radially projecting fingers, friction segments, wedging means securing said segments in position on said fingers, said wedging means comprising a ring in wedge engagement with all of said segments, each of said segments having spaced wedge faces, and tension means securing said ring.

8. A rotor comprising an integral spider having a hub and a plate, said plate having radially projecting fingers, friction segments, wedging means securing said segments in position on said fingers, said wedging means comprising a ring in wedge engagement with all of said segments, each of said segments having spaced wedge faces.

9. A friction element of segmental form comprising lateral walls having parallel friction faces and transverse walls with an opening therebetween, certain of said walls having slots for tongue and groove engagement with supporting means.

10. A rotor friction segment comprising parallel lateral walls with remote friction faces and parallel transverse walls slotted for tongue and groove engagement with associated supporting means, said segment having a securing lug with a wedge face.

11. A rotor friction segment comprising parallel lateral walls with remote friction faces and parallel transverse walls slotted for tongue and groove engagement with associated supporting means, said segment having a plurality of securing lugs with concentric wedge faces.

12. A rotor comprising an integral spider having a hub and a plate, said plate having radially projecting fingers, friction segments, and wedging means securing said segments in position on said fingers, said wedging means comprising a ring in wedge engagement with all of said segments.

13. A rotor having a spider with a supporting hub and a plate, radial projections on said plate, segmental friction elements fixed on said projections, each of said elements comprising a wedge face, and a wedge ring engaging all of said faces.

14. A rotor having a spider with a supporting hub and a plate, radial projections on said plate, segmental friction elements fixed on said projections, each of said elements comprising a wedge face, a wedge ring engaging all of said faces, and tension means for securing said wedge ring.

15. A rotor having a spider with a supporting hub and a plate, radial projections on said plate, and segmental friction elements slidably sleeved onto said projections and capable of slidable movement therealong radially outwardly with respect to said plate, and means connected to said plate and elements independently of said projections for restraining said elements against movement radially outwardly with respect to the plate.

16. A brake rotor comprising a plurality of friction segments arranged in a generally annular series to define a brake ring with segmental annular friction surfaces on opposite sides thereof, a rotatable support member with a series of seats facing radially outwardly from the rotational axis of said member, readily movable means securing said segments to said seats, and means on said member having surfaces spaced from said seats between the inner and outer perimeter of said ring and bearing against said segments to afford a driving connection between said segments and said member.

17. A brake rotor comprising an annular support member having means for connection to an associated wheel and axle assembly, a plurality of friction members, each including spaced friction surfaces, a driving connection between said support member and each friction member intermediate the friction faces of the latter, whereby rotation of said support member effects rotation of said friction members, and a removably attached retaining ring for connecting said support and friction members to prevent radially outward movement of said friction members due to centrifugal force thereon during rotation of said support member.

18. A brake rotor comprising a support structure with a plurality of radially outwardly facing seats, a plurality of friction elements arranged in an annular series positioned on said seats and presenting braking faces, a driving connection between said elements and said structure, and readily removable means radially inwardly of said faces securing said elements against said seats.

19. In a brake rotor, a support, a plurality of friction segments arranged in an annular series mounted on said support, each segment presenting friction surfaces at opposite sides of said support and having an opening therethrough receiving a portion of the support therein and defining axially spaced fluid chambers therewith, each segment being spaced along its edges from the adjacent segments and defining fluid passages therewith along said edges extending transversely of said surfaces, adjacent segments being formed and arranged along said edges to define fluid passage means therebetween communicating with the adjacent passages.

FRED E. BACHMAN.

REFERENCES CITED

The following references are of record in the file of this patent:

UNITED STATES PATENTS

| Number | Name | Date |
|---|---|---|
| 1,735,891 | Bryant | Nov. 19, 1929 |
| 1,954,330 | Schurr | Apr. 10, 1934 |
| 1,964,566 | Fawick | June 26, 1934 |
| 2,042,570 | Wemp | June 2, 1936 |
| 2,141,164 | Brehm | Dec. 27, 1938 |
| 2,201,339 | Hunt | May 21, 1940 |
| 2,485,082 | Bachman | Oct. 18, 1949 |
| 2,553,828 | McCune | May 22, 1951 |

FOREIGN PATENTS

| Number | Country | Date |
|---|---|---|
| 171,503 | Great Britain | Nov. 24, 1921 |
| 403,513 | Great Britain | Dec. 28, 1933 |